INVENTORS
JOSEPH N. GENESE
EDWARD J. RAPOZA
CHARLES F. GALANAUGH
HARRY H. KENNARD
ROGER A. CHEVALAZ
JOHN A. SMITH
BY
Kane, Dalsimer, Kane, Sullivan + Kurucz
ATTORNEYS INVENTORS
JOSEPH N. GENESE
EDWARD J. RAPOZA
CHARLES F. GALANAUGH
HARRY M. KENNARD
ROGER A. CHEVALAZ
JOHN A. SMITH
BY Kane, Dalsimer, Kane, Sullivan+Kurucz
ATTORNEYS Sept. 20, 1971 J. N. GENESE ET AL 3,605,829

BLOOD HANDLING MACHINE

Filed April 29, 1970 11 Sheets-Sheet 6

INVENTORS
JOSEPH N. GENESE
EDWARD J. RAPOZA
CHARLES F. GALANAUGH
HARRY H. KENNARD
ROGER A. CHEVALAZ
JOHN A. SMITH

BY Kane, Dalsimer, Kane, Sullivan + Kurucz
ATTORNEYS

INVENTORS
JOSEPH N. GENESE
EDWARD J. RAPOZA
CHARLES F. GALANAUGH
HARRY M. KENNARD
ROGER A. CHEVALAZ
JOHN A. SMITH
BY
*Kane, Dalsimer, Kane, Sullivan + Kurucz*
ATTORNEYS

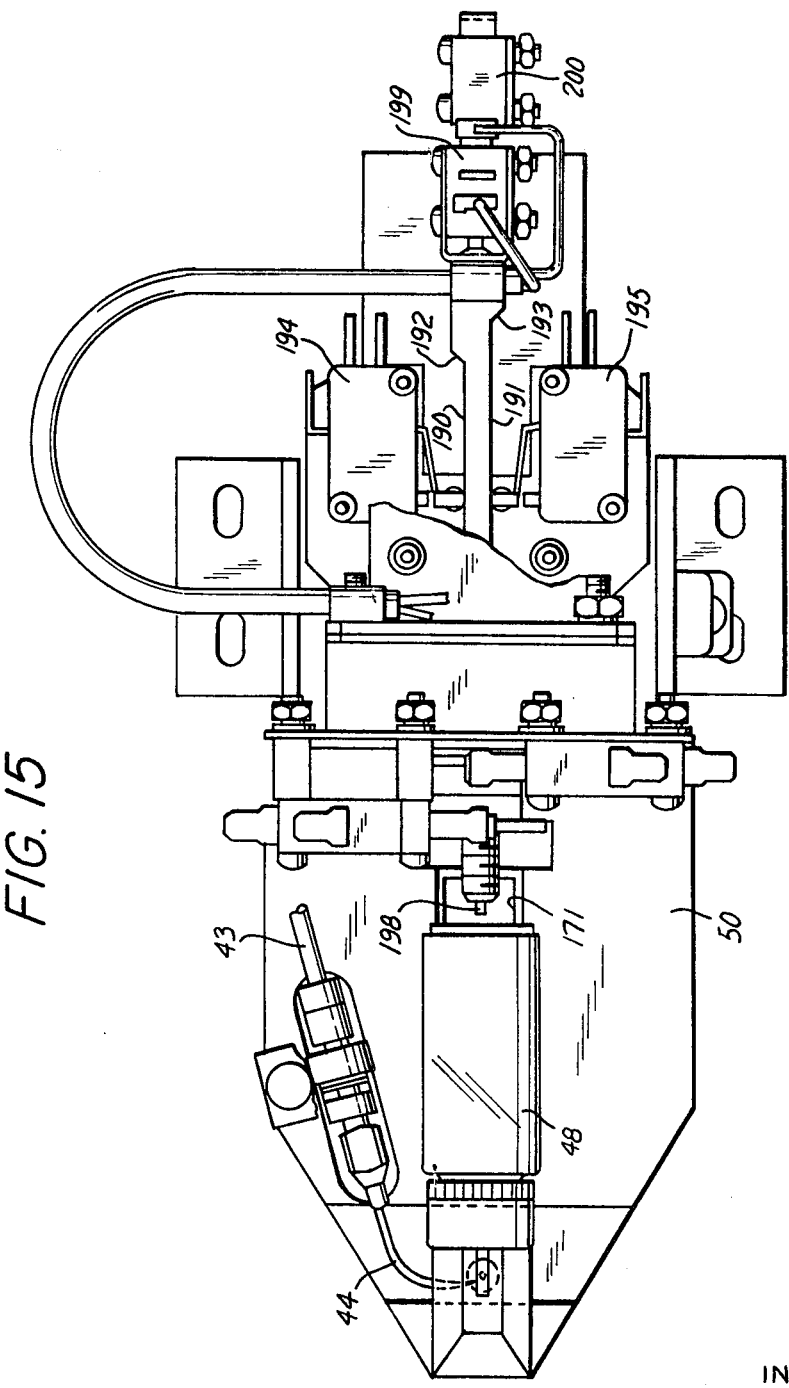

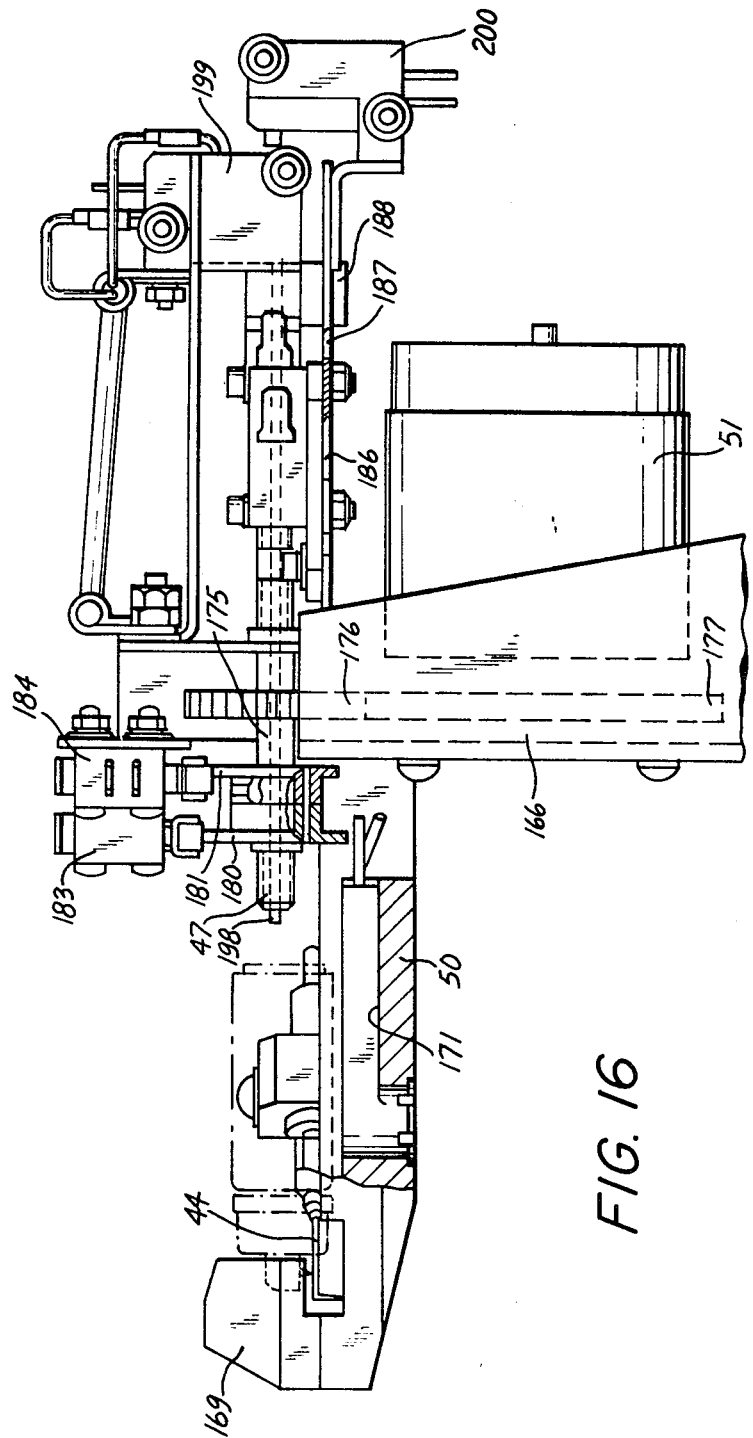

Sept. 20, 1971 J. N. GENESE ET AL 3,605,829
BLOOD HANDLING MACHINE
Filed April 29, 1970 11 Sheets-Sheet 11
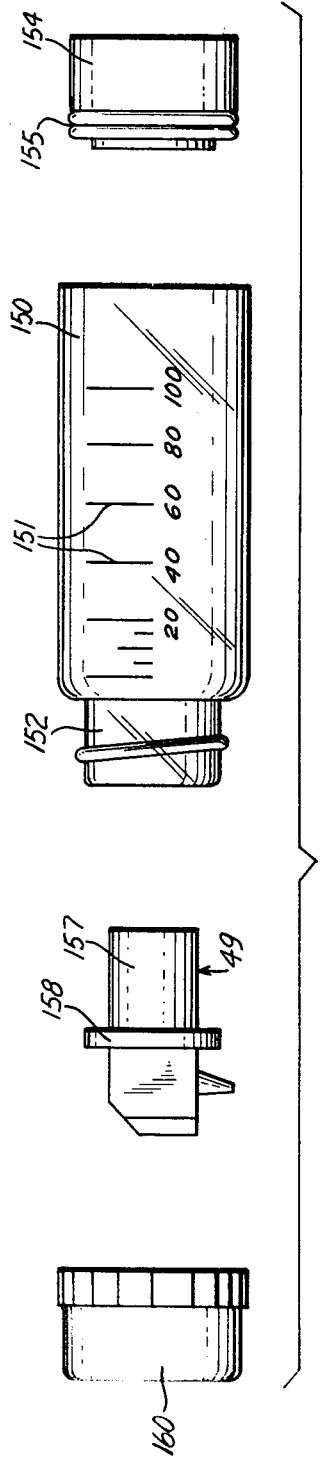
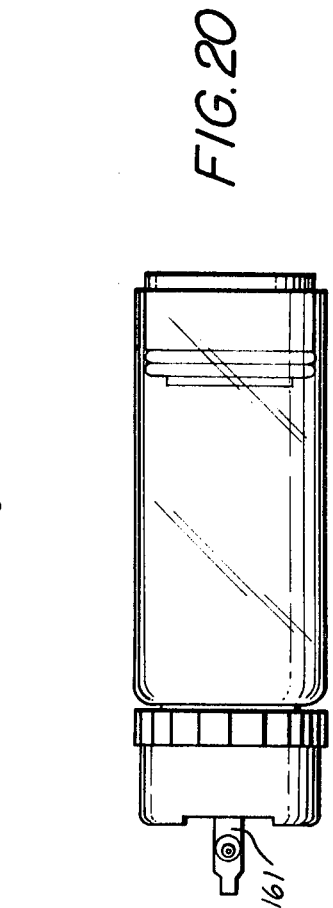
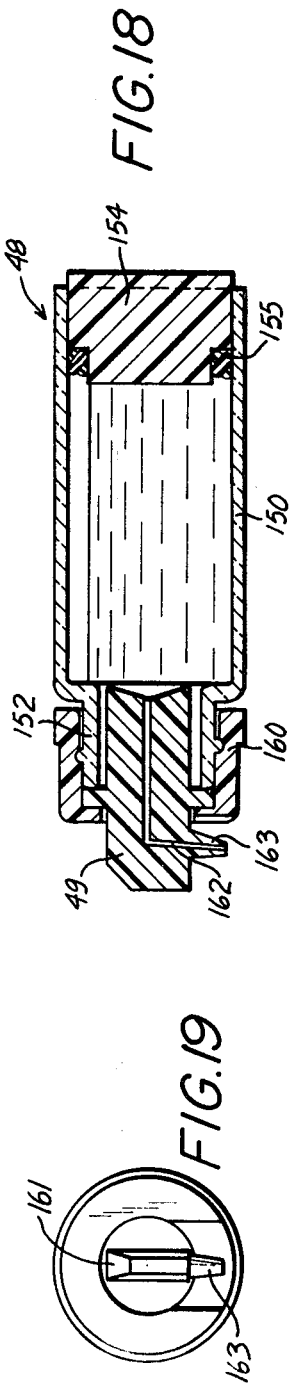
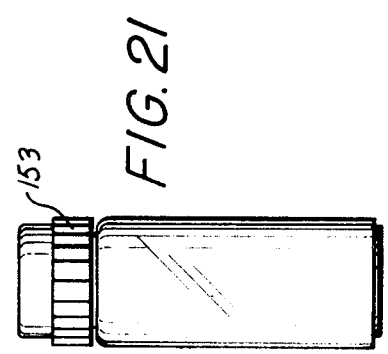
INVENTORS
JOSEPH N. GENESE
EDWARD J. RAPOZA
CHARLES F. GALANAUGH
HARRY M. KENNARD
ROGER A. CHEVALAZ
JOHN A. SMITH
BY
Kane, Dalsimer, Kane, Sullivan + Kurucz
ATTORNEYS

United States Patent Office 3,605,829
Patented Sept. 20, 1971

3,605,829
BLOOD HANDLING MACHINE
Joseph N. Genese, Paterson, Edward J. Rapoza and Charles F. Galanaugh, Butler, Harry M. Kennard, Chester, Roger A. Chevalaz, Rockaway, and John A. Smith, East Orange, N.J., assignors to Becton, Dickinson and Company, East Rutherford, N.J.
Filed Apr. 29, 1970, Ser. No. 32,915
Int. Cl. B65b 1/22
U.S. Cl. 141—79          9 Claims

ABSTRACT OF THE DISCLOSURE

An apparatus for automatically performing a series of operations on a blood sample contained in a vial. For example, in performing the Coombs antiglobulin test, the apparatus is programmed to initially inject saline into the vial, to centrifuge the vial at approximately 1300 RCF, and then to decant the saline from the vial leaving a "button" of blood cells in the vial. The above sequence is repeated three times, and then a predetermined amount of Coombs serum is injected into the vial. The vial is then agitated to mix the serum with the blood cells, and then it is centrifuged at 500 RCF. At the termination of the centrifuging operation, the sample will be ready for final analysis by a technician. In carrying out this invention, a circular turntable is provided having a plurality of receptacles positioned about its outer periphery. Each of the receptacles is adapted to receive a single vial and includes a pivotally mounted flag which is lifted to a horizontal position whenever a vial is present. An electrical motor is provided to rotate the turntable, and a dispensing mechanism overlies the periphery of the turntable and includes a nozzle for injecting the saline as well as a nozzle for injecting the Coombs serum downwardly into the vial. A photoelectric mechanism is provided for detecting a horizontal flag which then actuates the appropriate injection mechanism. The Coombs injecting mechanism includes a removable cartridge containing the serum. The cartridge comprises a tubular barrel which is closed at its forward end by a nozzle and at its rear end by a cylindrical piston positioned within the bore of the barrel. The mechanism further includes a plunger for driving the piston into the bore of the barrel to dispense the liquid from the forward nozzle.

BACKGROUND AND SUMMARY OF THE INVENTION

The present invention relates to an apparatus for automatically performing various test operations on a fluid sample. In particular, the apparatus of the present invention is designed to automatically perform the Coombs antiglobulin test.

In the Coombs test as presently performed, a technician initially places a sample of red blood cells to be tested in a vial. A relatively large amount of saline is then added to form a homogeneous mixture, and the vial containing this mixture is placed in a centrifuge where it is spun at approximately 1100–1300 RCF (relative centrifugal force, or G's) for about one minute. Centrifugation causes the red cells to be washed through the saline to form a "button" of cells at the bottom of the vial. Next, the saline is removed from the vial by decanting, the "button" of red cells remaining at the bottom of the vial. This completes the washing cycle which is normally conducted three times. After the three wash cycles, approximately two drops of Coombs serum are added to the cells. This mixture is agitated by manually shaking the vial to mix the cells with the serum, and then centrifuged at approximately 1000 RCF for about 15 seconds. To analyze the results, the technician removes the vial from the centrifuge and visually determines whether agglutination has occurred. If so, the test is considered to be positive, indicating incompatible antibodies on the patient's red cells.

It will be apparent from the above description that the Coombs test as presently performed is a time-consuming operation. In addition, modern blood banks require that a great number of these tests be continuously conducted to determine the compatibility of blood samples from different individuals. These factors combine to create a problem not only in obtaining the necessary number of highly trained personnel to conduct the tests, but also in insuring accurate test results. A false determination could have fatal consequences, and could easily result from an inaccurate measurement of one of the reagents or from an inexact timing of a particular operation in the sequence.

Accordingly, it is an object of the present invention to provide an apparatus for automatically performing the various operations required in the Coombs test. In particular, the apparatus is capable of sequentially mixing, agitating, centrifuging, and decanting the various fluids required. Since the procedural sequence of the test is programmed into the apparatus, there is no opportunity for human mistakes. Also, the apparatus requires a minimum of personal attention to thereby free the technician for other duties as the test is being conducted.

Among the several other objects and advantages of the present invention are the following:

(1) The provision of an apparatus capable of controlling and standardizing the several important variables inherent in the manual Coombs test procedure, as for example, the quantity of saline used in each wash cycle, the quantity of Coombs serum added to each vial, and the centrifugation speed and time.

(2) The provision of an apparatus capable of handling any intermediate number of test vials up to the maximum design limitation of the machine.

(3) The provision of a fill system for both the saline and Coombs serum, including a photoelectric detection system whereby the fluid is automatically dispensed only into the vials positioned in the apparatus.

(4) The provision of an apparatus having a rotatable head for retaining the vials during the entire test operation, the vials being positioned in one of several carriers which are pivotally positioned about the periphery of the head.

(5) The provision of a magnetic control arrangement whereby the carriers containing the vials may be tilted at a negative angle for decanting, or agitated for mixing.

(6) The provision of a cartridge for both transporting and dispensing the Coombs serum, the cartridge being adapted to be mounted in the Coombs fill system without having to transfer the serum to a separate container first.

(7) The provision of an apparatus capable of simultaneously decanting a number of vials in a carefully controlled manner such that a saline solution may be ejected while a "button" of heavier red blood cells may be retained.

BRIEF DESCRIPTION OF THE DRAWINGS

In the drawings.

FIG. 15 is a top plan view of the Coombs injection assembly portion of the apparatus of the invention;

FIG. 16 is a partially sectional side elevation view of the Coombs injection assembly portion;

FIG. 17 is an exploded perspective view of a cartridge utilized with the apparatus of this invention;

FIG. 18 is a sectional side elevation view thereof with the cartridge in an assembled form for use;

FIG. 19 is an end plan view of the cartridge of the apparatus of the invention;

FIG. 20 is a side elevation view of the cartridge in assembled form for use with the remainder of the apparatus; and FIG. 21 is a side elevation view of the cartridge in condition for shipping prior to its assembly for use with the apparatus of this invention.

DESCRIPTION OF THE PREFERRED EMBODIMENT

General description of overall apparatus

Figure 1:
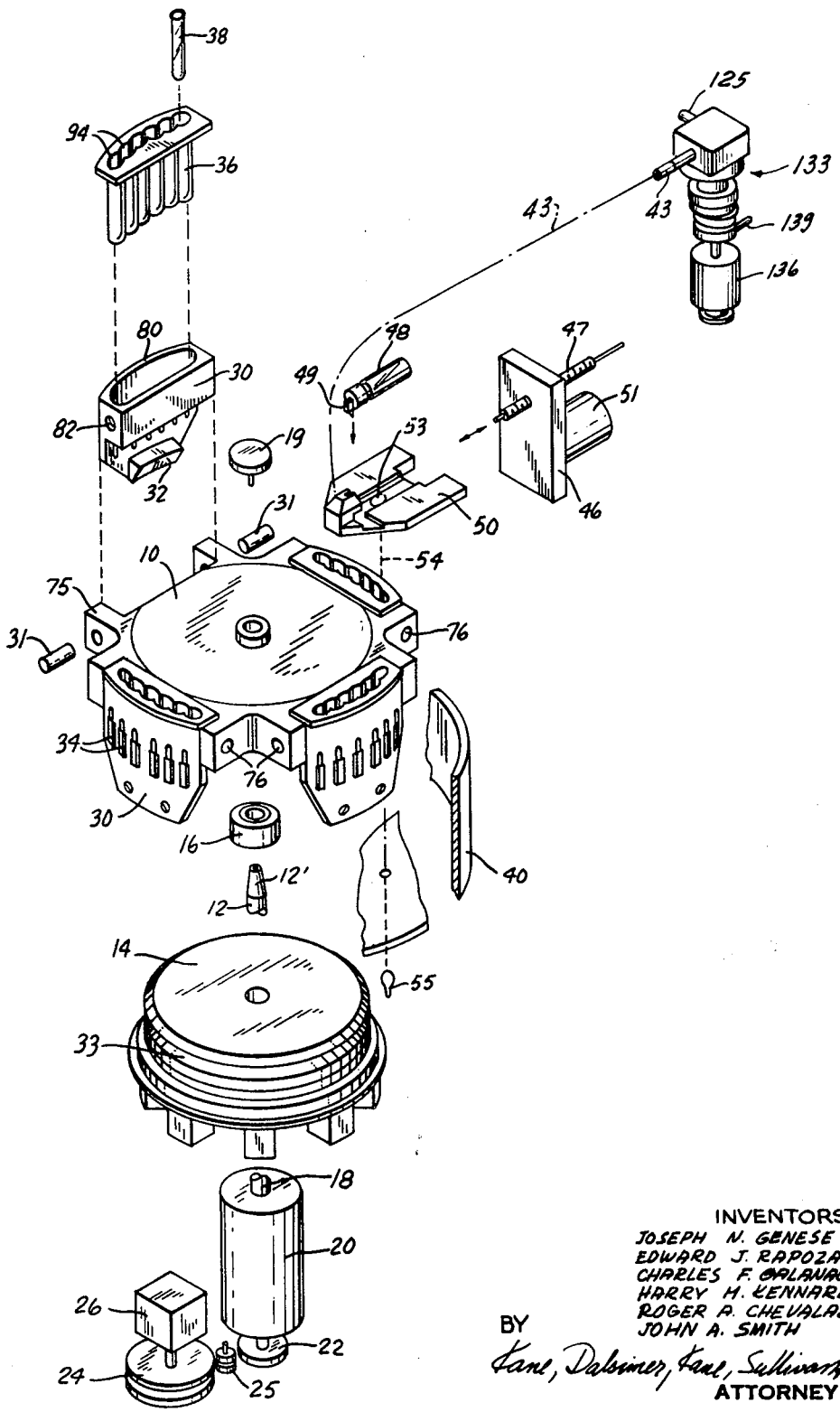
FIG. 1 is an exploded perspective view of the basic components of the apparatus of the invention.

The various components of the present invention are illustrated schematically in FIG. 1. Generally, the apparatus comprises a circular turntable or head 10 mounted for rotation on a vertical shaft 12 which extends through the stationary base 14 and which is coaxially secured to the shaft 18 of the main motor 20. The head 10 is frictionally mounted on the tapered end 12' of the shaft 12 and is secured thereto by the knurled head retaining screw 19. Thus, the head 10 rotates with the shaft 12. A conventional one-way clutch bearing 16 is frictionally mounted about the shaft 12 such that its internal race rotates with the shaft. The external race of the bearing is secured to the base 14 and thus remains stationary. By this arrangement, it will be apparent that the head 10 is free to rotate only in one direction.

The opposite end of the main motor shaft 18 mounts an engagement wheel 22. The wheel 22 is adapted to be selectively connected to an index wheel 24 across a pivoting idler 25. The index wheel 24 is connected to the drive shaft of the index motor 26.

The head assembly of the apparatus includes the head 10 which supports a plurality of trunnions 30 pivotally mounted about the pins 31 for rotation about an axis which forms a chord to the upper surface of the head. Each trunnion mounts a magnetic insert 32 which is positioned immediately opposite a magnetic pole ring 33 positioned coaxially beneath the base 14. Each trunnion also includes a plurality of individual flags 34 and is adapted to removably receive a tube carrier 36. Each carrier 36 is in turn adapted to receive a number of test tubes or vials 38. A windage bowl 40 encloses the bottom and sides of the entire head assembly.

Figure 2:
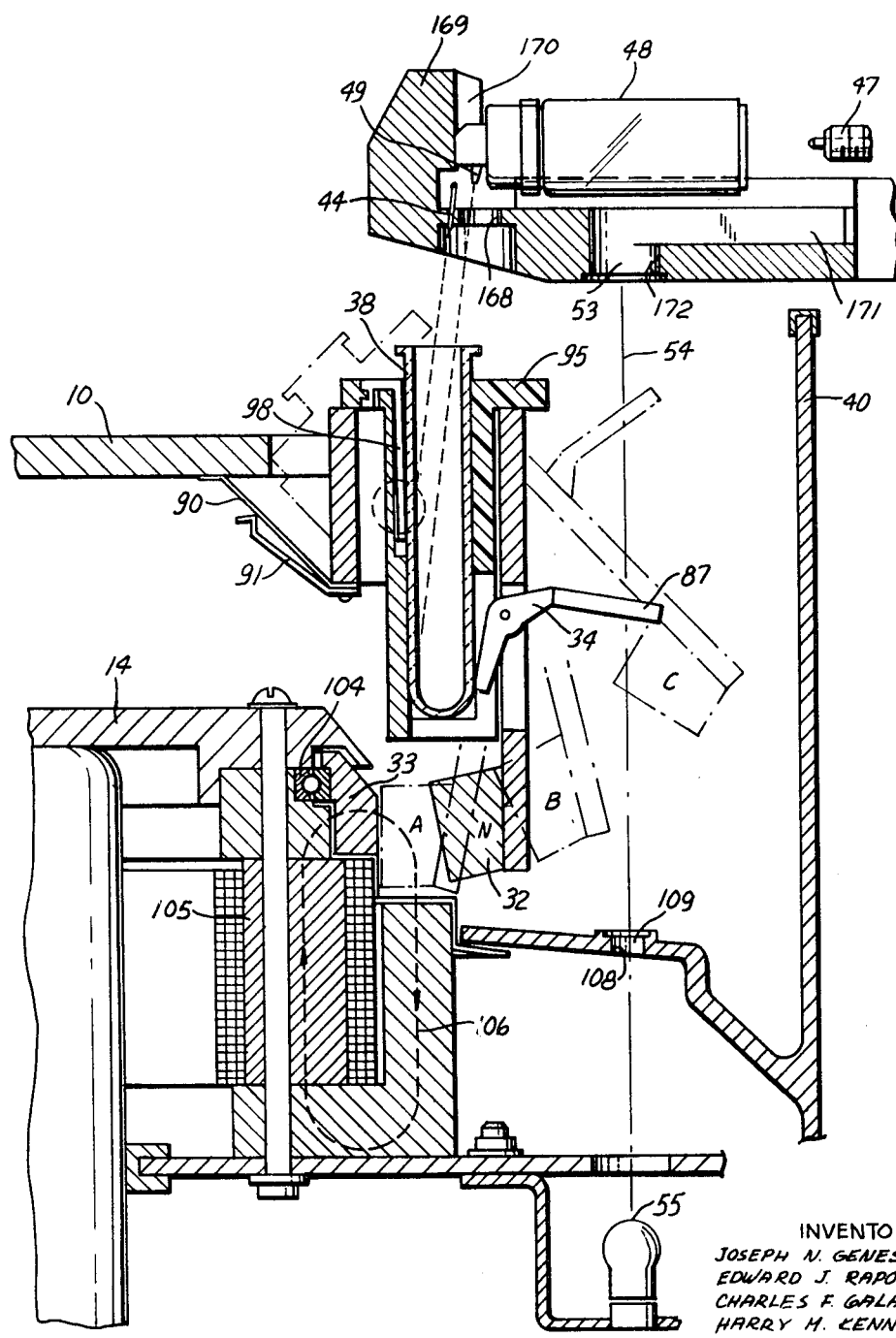
FIG. 2 is a fragmentary sectional elevation view of the head assembly portion thereof.

The saline fill assembly is designated generally at 42 in the drawings and includes a discharge tube 43 leading to a nozzle 44 (FIG. 2). The saline assembly is adapted to periodically inject saline downwardly from the nozzle 44 into a tube 38 which is positioned in the tube carrier 36 on the head.

The Coombs serum injection assembly is designated generally at 46 and includes a plunger 47, a serum-filled cartridge 48 having a nozzle 49, a cartridge holding frame 50, and an injection motor 51 for driving the plunger 47. To detect the presence of a tube 38 on the rotating head of the apparatus, a photocell is mounted at 53 immediately adjacent the injection nozzles 44 and 49. The photocell is adapted to monitor the light beam 54 emanating from the bulb 55. As will be more fully described hereinafter, the presence of a tube 38 in its tube carrier causes the assorted flag 34 to interrupt the light beam 54 as the head is rotated past the holding frame 50 for the saline and Coombs injection nozzles. The interruption of the light beam actuates either the saline fill system or the Coombs injection system.

Figure 3:
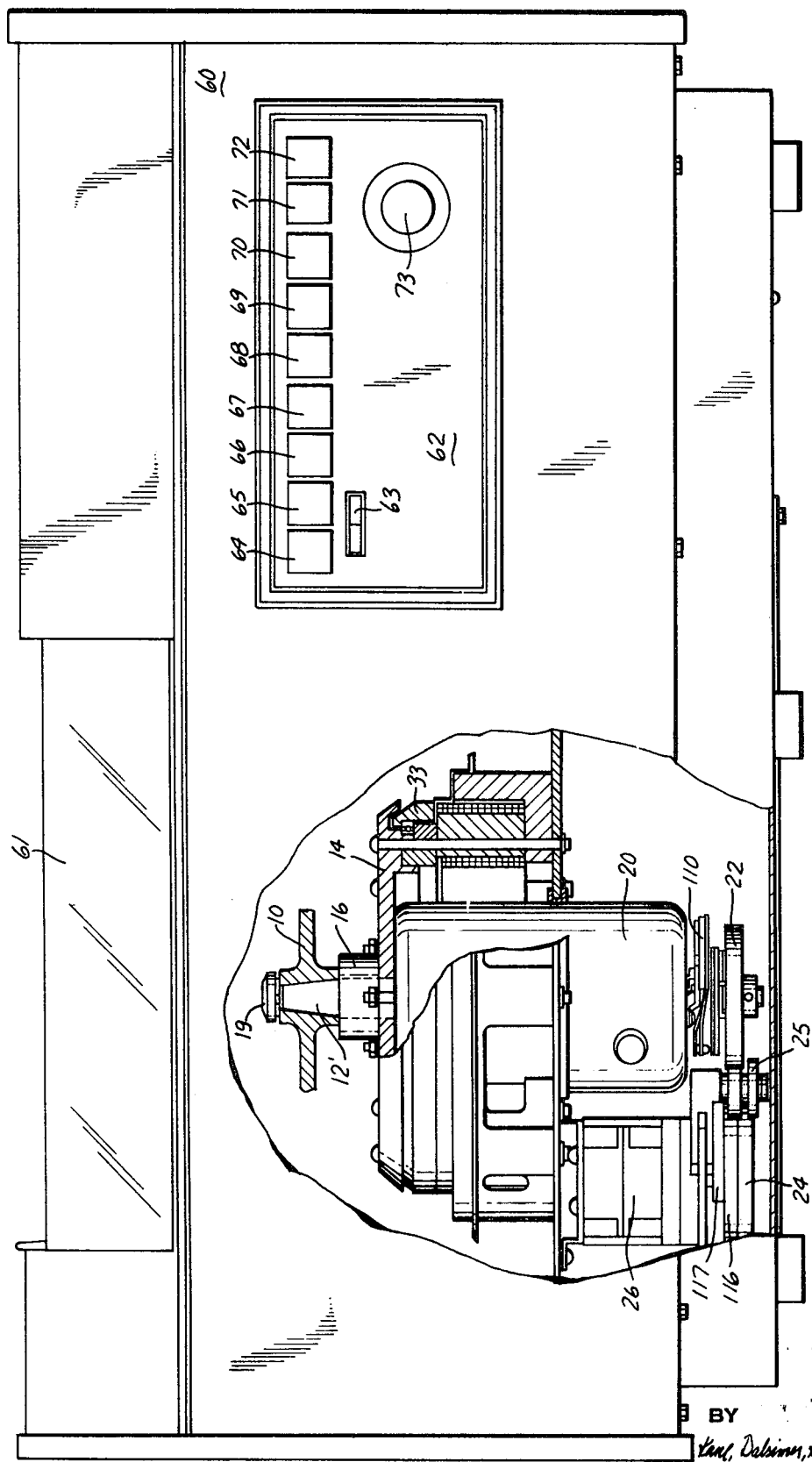
FIG. 3 is a fragmentary front elevation view thereof.

The outer cabinet of the apparatus is generally indicated at 60 in FIG. 3. The cabinet includes a rectangular box-like framework which is covered by suitable panels to enclose the working components of the machine. The upper portion of the cabinet includes a sliding glass or plastic lid 61 which is designed to permit entry to the head and injection assemblies when opened, and to protect the technician when closed during the operation of the device. If desired, a suitable switch (not shown) may be provided whereby the machine will operate only when the lid is closed.

A control panel 62 is mounted on the front of the cabinet as best seen in FIG. 3. The control panel includes an on-off switch 63 which controls the power to the machine. A green power indicator light is mounted at 64 and is lighted whenever the power switch is on. A start button and indicator light is mounted at 65 which, when actuated, starts the automatic cycle and lights green when the cycle is in progress. A stop button and red indicator light 66 stops the machine at any time during the cycle and lights red when the machine is stopped or the lid is open. A 500 RCF spin button 67 starts an independent intermediate spin as will be described hereinafter. A low indicator light is mounted at 68 and lights amber when the Coombs cartridge 48 is low on serum. An empty indicator light is mounted at 69 and lights red when the Coombs cartridge is empty. Fill, spin, and decant indicator lights are mounted at 70, 71 and 72, respectively. These lights are lighted when these points in the automatic wash cycle are reached. The programmer 73 is connected to the main timer of the apparatus and indicates which stage has been reached in the cycle. It can be turned to select any of the three wash cycles.

The entire head assembly is surrounded by a windage bowl 40 which may be fabricated from any suitable plastic or similar material. The lower wall of the bowl includes an aperture 108 having a glass lens mounted at 109. From FIG. 2, it will be apparent that the aperture 108 is designed to permit the light beam 54 emanating from the bulb 55 to reach the photocell at 53. The bowl 40 further includes a drain (not shown) positioned at the intersection of the bottom and side walls.

Head assembly

Figure 4:
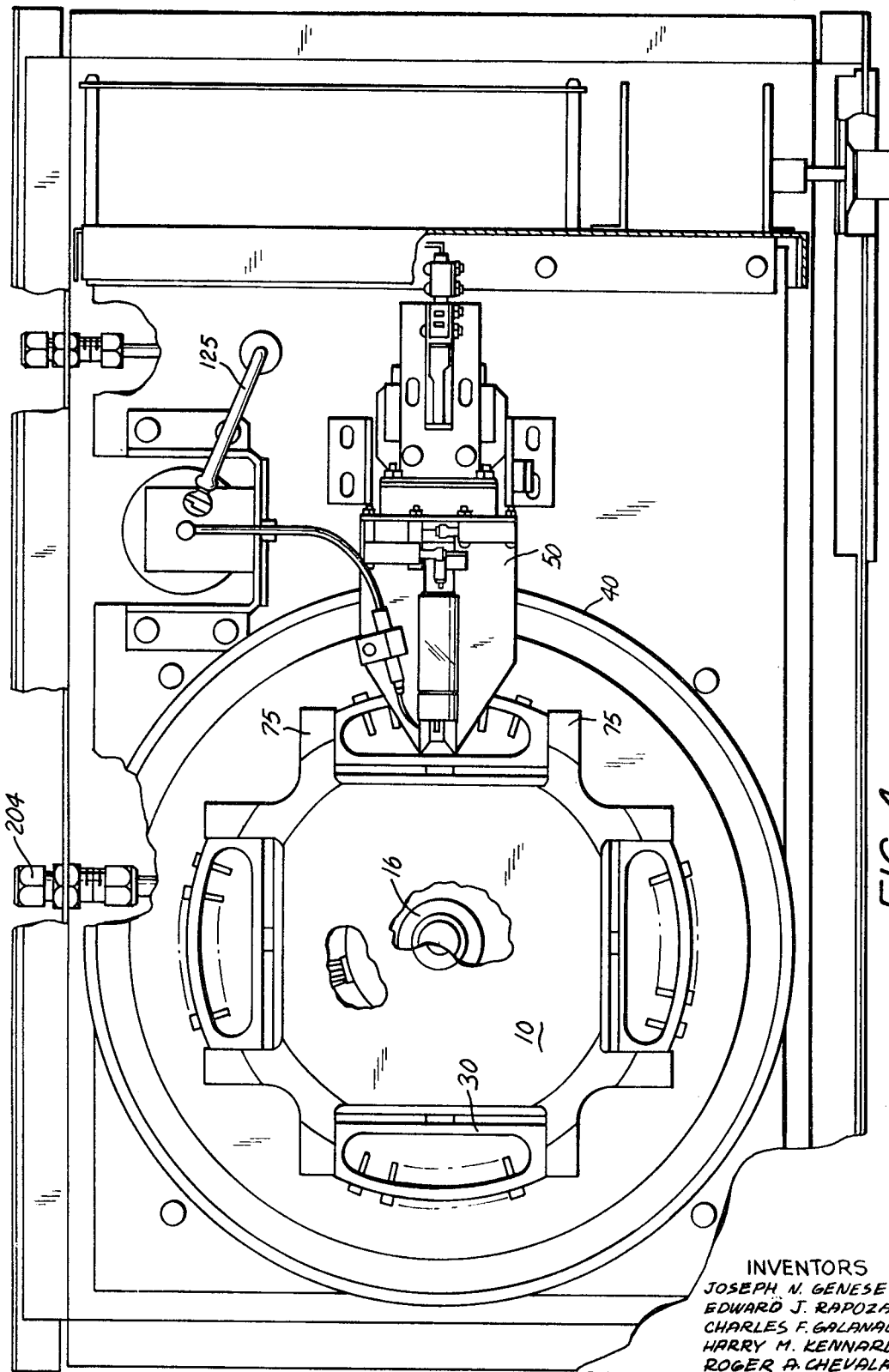
FIG. 4 is a top plan view thereof.
Figure 5:
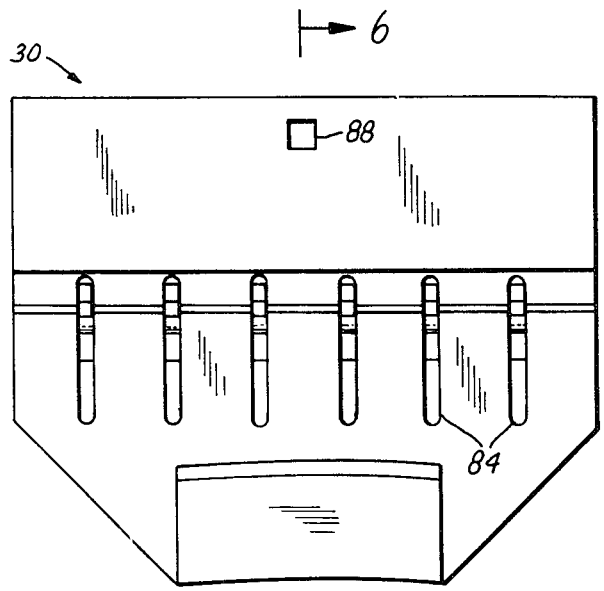
FIG. 5 is a side elevation view of a trunnion portion thereof.
Figure 6:
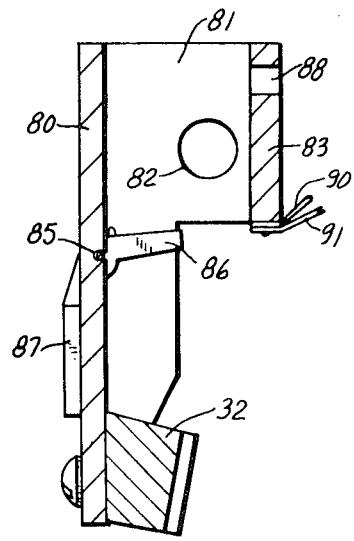
FIG. 6 is a sectional end elevation view of the trunnion portion taken along the plane of line 6—6 of FIG. 5.
Figure 7:
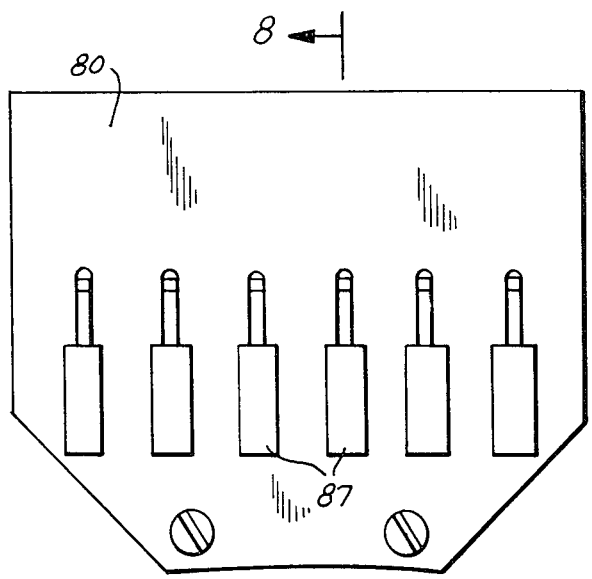
FIG. 7 is a side elevation view of the other side of a trunnion assembly of the invention.
Figure 8:
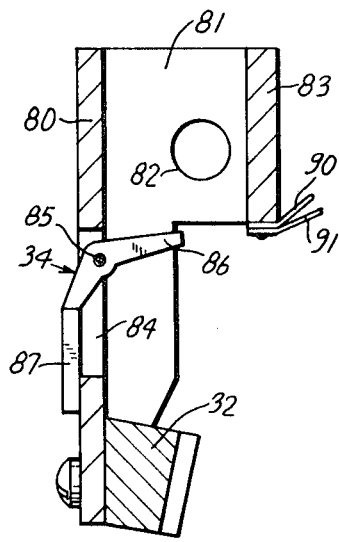
FIG. 8 is an end sectional elevation view thereof taken along the plane of line 8—8 of FIG. 7.
Figure 9:
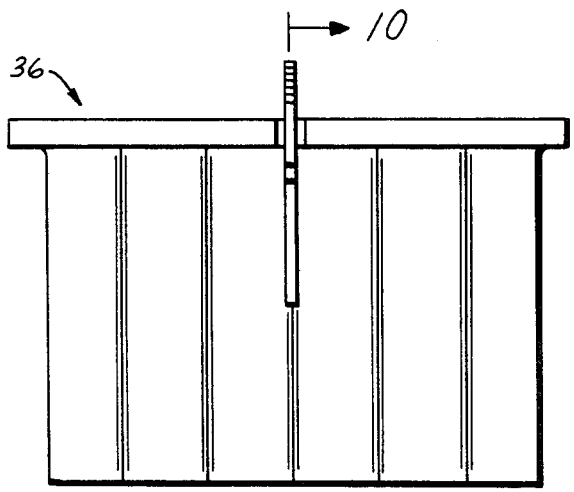
FIG. 9 is a front side elevation view of the carrier portion of the apparatus of the invention.
Figure 10:
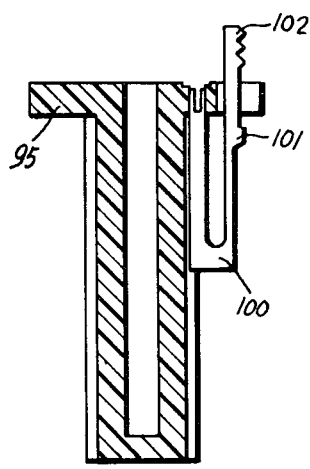
FIG. 10 is a sectional end elevation view of the carrier portion taken along the line 10—10 of FIG. 9.
Figure 11:
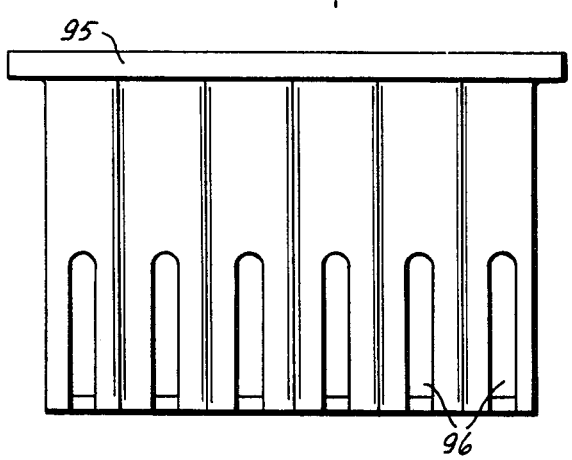
FIG. 11 is a rear side elevation view of the carrier portion of the apparatus of the invention.
Figure 12:
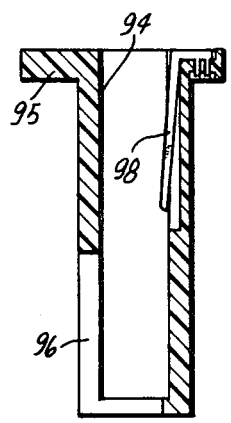
FIG. 12 is a sectional end elevation view of the carrier portion taken along the plane of line 12—12 of FIG. 11.

Referring more specifically to the structural components of the embodiment of the invention illustrated herein, the head assembly thereof is illustrated in detail in FIGS. 2–4. This assembly includes the head 10 which is mounted for rotation upon the shaft 12 which is coaxially secured to the rotor 18 of the reversible main motor 20. The shaft 12 extends through the fixed base member 14 and includes a tapered end 12' to receive a correspondingly tapered bore in the hub of the head 10. A knurled head retaining screw 19 is coaxially inserted into the shaft 12 to retain the positioning of the head on the shaft 12, note FIG. 3.

The one-way clutch bearing 16 has its internal bearing surface frictionally engaged by the shaft 12, and its external surface is secured to the fixed base 14. By this arrangement, the head may be rotated only in one direction, that being counterclockwise in the illustrated embodiment. This feature is utilized in conjunction with the braking operation which occurs at the termination of the centrifuging operations. In particular, reversal of the polarity of the motor 20 while the head is rapidly rotating creates a resistance to continued rotation. When the head completely stops, rotation in the opposition direction is precluded by the bearing 16.

The outer periphery of the head 10 includes four trunnion mounting stations, each defined by a pair of outwardly extending parallel lugs 75. The two lugs at each station include aligned openings 76 (FIG. 1) therethrough which define a chord line along the periphery of the head. The openings 76 are adapted to receive the mounting pins 31 for the trunnion 30, whereby the trunnion is rotatably mounted about the axis formed between the two openings 76.

The details of the trunnion 30 and carrier 36 are illustrated in FIGS. 5-8 and 9-12 respectively. In particular, the trunnion 30 includes an arcuate outer or front wall 80, two parallel side walls 81 having aligned apertures 82 to receive the mounting pins 31, and a relatively flat back wall 83. The front wall 80 extends below the other walls and includes a plurality of slots 84 for mounting the flags 34. Each flag is pivotally mounted about a pin 85 at the top of the associated slot and includes a relatively short inwardly directed arm 86 and a relatively long downwardly directed arm 87. Because the downwardly directed arm 87 is heavier the flag 34 is normally rotated to the position shown in FIGS. 6 and 8. The lower inside surface of the front wall also mounts a magnetic insert 32 fabricated from cast iron or some other soft magnetic material. The inside surface of the insert is arcuate to mate with the outer surface of the pole ring 33 when the trunnion is rotated in the negative direction, note FIG. 2. It should also be noted that the back wall of the trunnion includes a small rectangular aperture 88. In addition, the back wall of the trunnion mounts a pair of springs 90 and 91 to be further described below.

The carrier 36, which may be fabricated from any suitable plastic material such as the polymer Lexan, includes a plurality of individual receptacles 94 for receiving individual vials 38. In the embodiment illustrated, each carrier has six receptacles and is therefore designed to receive six vials. The alignment of the receptacles will be seen to be somewhat arcuate (note FIG. 1), whereby the lower portion of the carrier may be received in the opening defined by the four walls of the trunnion 30. The top of the carrier includes a transverse flange 95 which is adapted to rest on the upper surface of the trunnion when the two members are assembled. Also, each receptacle in the carrier includes a slot 96 running from the base of the front wall approximately half way up its length. By design, these slots are adapted to accommodate the inwardly directed arms 86 of the flags 34 whereby the arms will extend transversely into the receptacles 94 when the carrier is mounted in the trunnion.

In order to frictionally retain the vials in the receptacles of the carrier, a longitudinally extending flexible tab 98 may be mounted adjacent the top of each receptacle. Also, to retain the carrier in the trunnion during rotation of the head, a U-shaped resilient catch bar 100 may be mounted along the rear wall of the carrier. The outer side of the catch bar includes an abutment 101 which is adapted to engage in the rectangular aperture 88 of the trunnion when the two members are properly assembled. To release this engagement, the free outer edge of the catch bar extends upwardly at 102 where it may be inwardly flexed by the technician to release its engagement.

From the above description it will be apparent that the flags 34 remain in their normal position whether a carrier 36 is positioned in the trunnion 30 or not. It is only when an individual vial is inserted into a receptacle of the carrier that the outer arm 87 of the flag is raised to a horizontal position.

The magnetic control arrangement for the apparatus is best seen in FIG. 2 and includes the pole ring 33 positioned coaxially about the axis of the turntable 10. The pole ring is fabricated from any suitable soft magnetic material and is rotatably mounted on the bearing 104 immediately below the outer periphery of the fixed base 14. A number of electromagnetic coils 105 are positioned about the periphery of the base and adjacent the pole ring, such that the magnetic flux lines 106 of the coil pass through the ring when the coil is energized.

As seen in FIG. 2, the magnetic insert 32 of the trunnion is normally spaced a short distance from the pole ring (designated N in FIG. 2), with the spring 90 acting to maintain this position. However, upon actuation of the coil 105, the flux lines 106 draw the insert into contact with the ring to the position designated A. When this occurs, the trunnion 30 as well as the carrier 36 and retained vials 38 are disposed at a negative angle. When the coil is de-energized, the springs tend to flip the trunnion back to and somewhat past its original normal position to position B.

During the various centrifuging operations of the apparatus, it will be apparent that the trunnion will swing outwardly to the extended position C. The weight of the magnetic insert 32 contributes to the degree of rotation of the trunnion and thereby assures that the contents of the vials will not be expelled. During decanting, the magnetic insert is drawn into contact with the pole ring (position A) and the trunnions as well as the pole ring will be rotated at a reduced and carefully controlled speed. During agitation of the vial contents, alternate engagement and disengagement of the coil 105 causes the magnetic insert 36 to be alternately pulled into engagement with the pole ring and then flipped outwardly by the spring. Thus the trunnions are reciprocated between the positions A and C and the contents of the vials will be agitated.

Drive assembly

Figure 13:
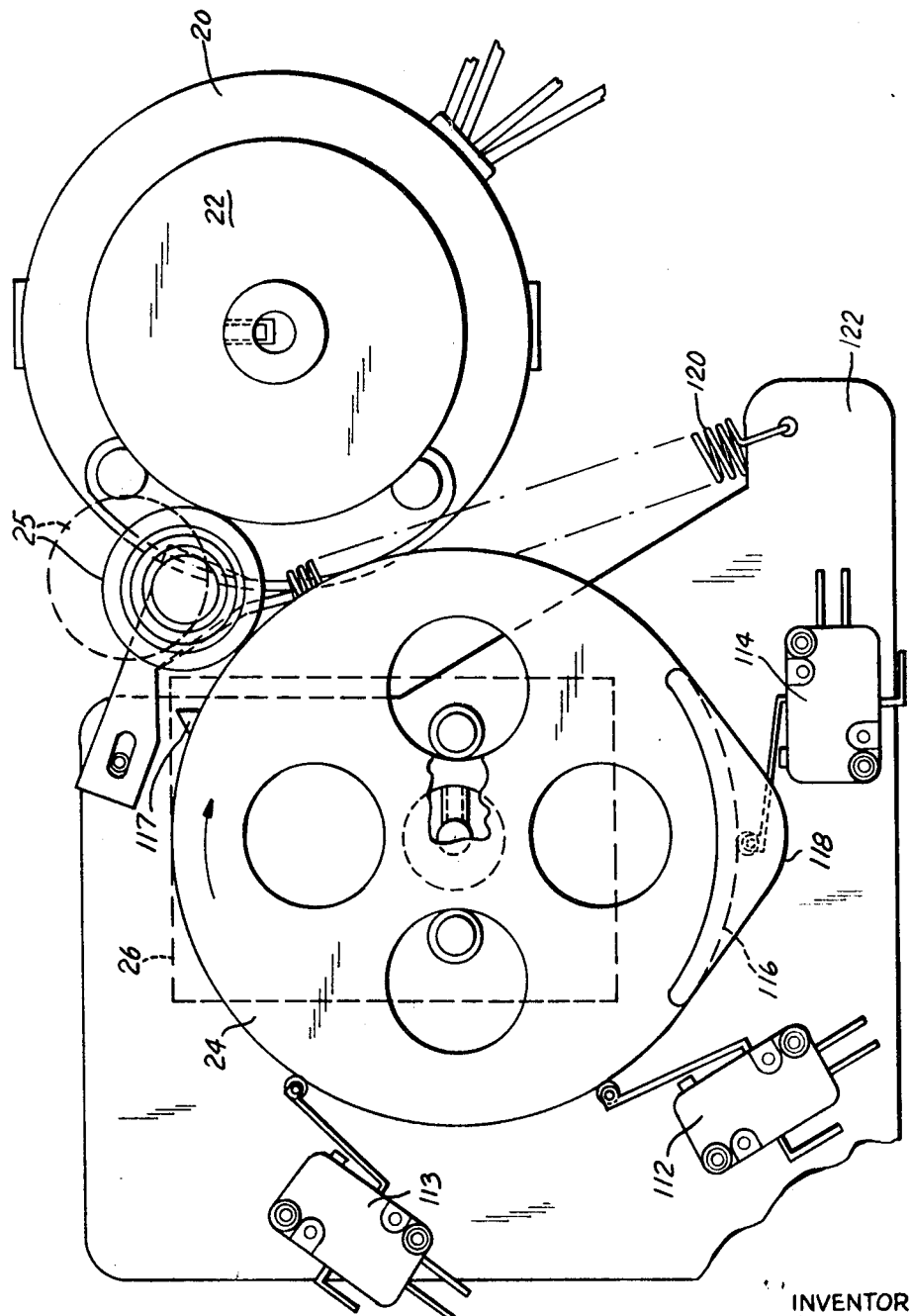
FIG. 13 is a fragmentary top plan view of a portion of the apparatus of the invention including the drive assembly.

The drive assembly for the head 10 is illustrated in detail in FIGS. 3 and 13. This assembly includes the reversible motor 20 which drives the head 10 during the centrifuging and decanting operations and the index motor 26 which drives the head during the saline and Coombs injection operations.

The lower end of the rotor 18 to the motor 20 mounts the engagement wheel 22. Interposed between the motor 20 and wheel 22, is a conventional centrifugal spaced control governor 110 for the motor, the function of which will be mentioned hereinafter. The wheel 22 permits the head 10 to be operatively connected to the index motor 26 across the index wheel 24 and idler 25 during the saline fill and Coombs injection operations. In the disclosed embodiment, the motor 26 is designed to rotate at approximately 1 r.p.m. and, by reason of the relative sizes of the wheels 22 and 24, it drives the head 10 at a slightly greater speed.

To control the injection systems during indexing of the head 10, a series of cam operated switches 112-114 are positioned about the periphery of the index wheel 24. These switches are adapted to ride on the coaxially disposed cam wheel 116 and be actuated upon engagement with the cam 117. It will be noted that the index wheel 24 also has a cam 118 on its outer periphery, the cam 118 being adapted to disengage the idler 25 from the engagement wheel 22.

At the initiation of the indexing operation, the index wheel cam 118 will have lifted the idler 25 from the engagement wheel 22 to the position shown in dotted lines, and the switch 112 will be tripped by the cam 117. The switch 112 acts as a safety feature in that centrifugation can only occur if it is tripped (indicating that the idler 25 is disengaged from the wheel 22), and thus there is no chance that the wheel 24 will be rotated during centrifugation. During initial rotation of the index wheel 24 in a clockwise direction as seen in FIG. 13, the idler 25 will be pulled into operative engagement with the two wheels by the spring 120 which is connected to the fixed frame member 122. The idler 25 preferably comprises two coaxially mounted hard rubber wheels to insure maximum frictional engagement.

After rotation of approximately 30°, the cam 117 engages the switch 113 which arms both the saline fill and Coombs injection systems. Since there may well be some initial slippage across the rubber idler wheels, a 30° idle is built into the system by this arrangement.

After arming of the injection systems, the photoelectric system begins to search for a horizontal flag indicating the presence of a vial 38 in the carrier 36. When the light beam 54 is interrupted by the presence of a horizontal flag arm, the index motor 26 is stopped and the appropriate injection cycle actuated. Upon completion of the injection, the index motor is started to continue the operation. This searching operation continues until the wheel 22 has completed a 360° revolution, at which time the cam 117 actuates the injection disarming switch 114. By design, the circumferential distance along the wheel 24 between the switches 113 and 114 is exactly equal to the circumference of the engagement wheel 22. Thus the injection systems are armed for exactly one revolution of the head 10. After disarming, the index wheel 24 continues to rotate until the switch 112 is again tripped by the cam 117 to enable subsequent centrifugation. At this point, the idler 25 is lifted from the engagement wheel 22 by the cam 118 such that the index wheel 24 will not be rotated during the subsequent centrifugation and decanting operations.

Saline fill assembly

Figure 14:
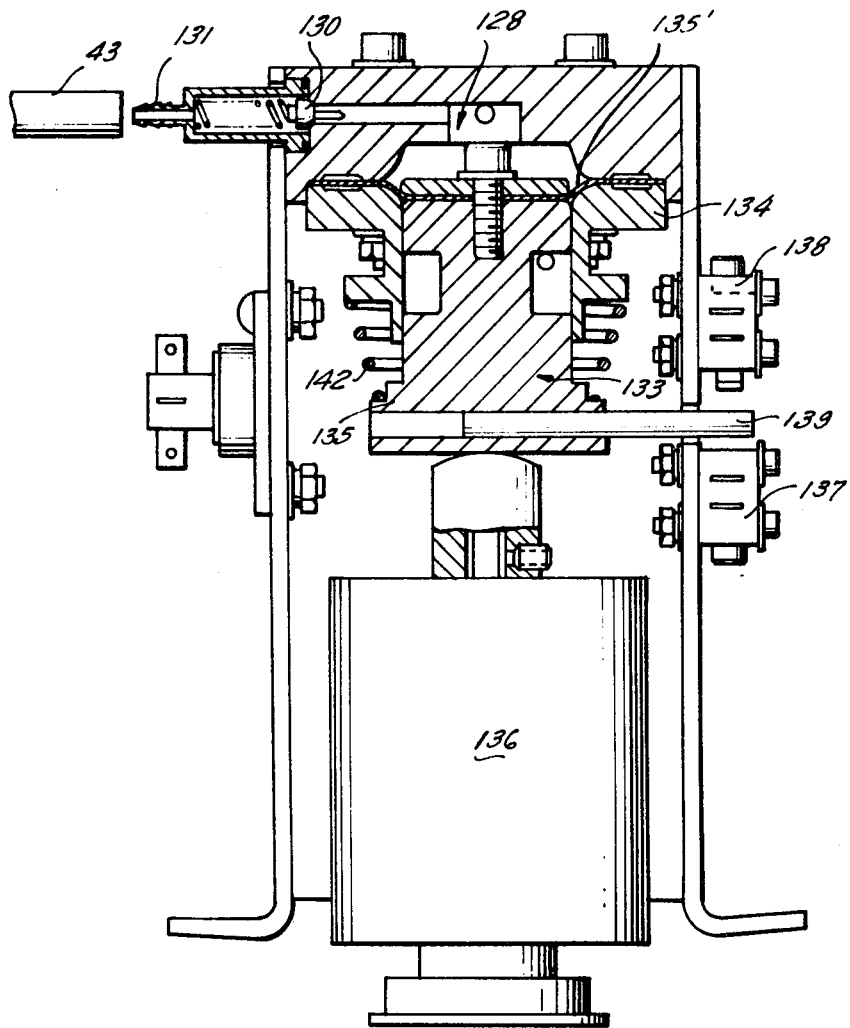
FIG. 14 is a sectional side elevation view of the saline fill assembly portion of the apparatus of the invention.
Figure 14A:
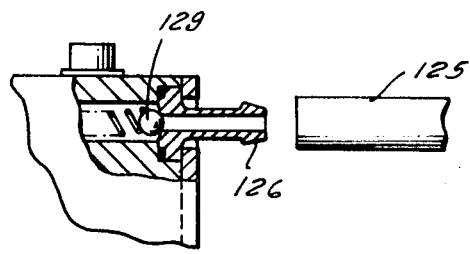
FIG. 14a is a fragmentary partially sectional side elevation view thereof.

The saline fill assembly 42 is illustrated in detail in FIGS. 14 and 14a. The saline enters the system from a suitable container (not shown) through a tube 125 which is attached to the inlet connector 126 of the double valve pump 128. The pump 128 is of conventional design and includes a pair of one-way check valves at 129 and 130 to permit the saline to be drawn through the connector 126 and discharged through the outlet connector 131 and tube 43. To provide the necessary pumping action, the pump 128 is attached to a diaphragm and plunger assembly 133 which is mounted in a suitable housing 134. The plunger 135 and attached diaphragm 135' of assembly 133 are adapted to be reciprocated by the solenoid 136 to first draw a measured quantity of saline through the inlet connector 126, and then discharge the same quantity of saline through the outlet connector 131.

Two switches 137 and 138 are mounted on housing 134 and are adapted to be sequentially actuated by the transverse abutment member 139 which is attached to plunger 135 of assembly 133. The switch 137 is actuated when the solenoid is in its normal down position (as shown in FIG. 14) and is designed to arm the solenoid. In other words, the solenoid cannot be actuated if for some reason it is not in its normal down position. This feature serves to guard against the possibility of injecting less than a full dose of saline through the pump 128. The switch 138 is actuated when the solenoid reaches its upper position and serves to deenergize the solenoid. The spring 142 is provided to then return the solenoid to its normal down position.

During operation of the saline injection system, it will be recalled that the index motor 26 will be slowly rotating the turntable and that the arming switch 113 at the index wheel will have armed the saline injection system. Whenever the photocell system detects a horizontal flag, the associated conventional circuitry stops the index motor 26 and, assuming the switch 137 is closed, actuates the solenoid 136. Upward movement of the solenoid drives the plunger 135 and diaphragm 135' of assembly 133 upward to force a predetermined amount of saline (about 3 ml.) through the discharge tube 43 and nozzle 44 and into the underlying aligned vial 38. When the solenoid reaches the upper limit of its travel, the switch 138 releases the solenoid and overrides the stop signal from the photocell circuit to again start the index motor 26. The spring 142 then returns the solenoid, plunger and diaphragm to their down position to draw the saline into the syringe from the saline tube 125. This cycle is repeated whenever a horizontal flag is detected by the photocell.

Whenever a new supply of saline is connected to the fill assembly, it is necessary to prime the system so that all of the air which may enter the tubing 43 and 125 will be expelled. For this purpose, a manually operated priming switch (not shown) is provided on the cabinet 60 which cycles the mechanism. In performing this operation, a small beaker is placed under the saline injection nozzle 44 and the prime switch actuated a number of times until all of the air is expelled from the system and a solid stream of saline is being delivered from the injection nozzle into the beaker.

Coombs injection assembly

The Coombs injection assembly 46 is illustrated in FIGS. 15–20 and includes the cartridge 48 which contains a measured amount of the serum. Typically, the cartridge contains nine ml. (milliliters) of the serum, which is sufficient for one hundred tests, i.e., .09 ml. per test. The cartridge 48 is designed to be disposable after use, and serves not only as the transfer vessel for the serum from the manufacturer, but also as an accurate dispensing mechanism when it is coupled with the remaining portion of the injection assembly 46.

As best seen in FIGS. 17–20, the cartridge 48 comprises a tubular glass barrel 150 having a dimensionally controlled internal diameter. The external surface may, if desired, be graduated as at 151 to indicate the number of doses remaining. The forward end of the barrel includes a threaded neck portion 152 which is designed to be sealed during shipment by a separate closure cap 153 (FIG. 21) in the conventional manner. The rear end of the barrel is closed by a hard rubber cylindrical piston 154 which may include a circumferential resilient rubber sealing ring 155.

To prepare the cartridge for use, the closure cap 153 is removed and the nozzle 49 inserted into the open neck of the barrel. The nozzle 49 may be fabricated from a similar hard rubber material, and includes an enlarged diameter plug portion 157 which is somewhat less in diameter than the internal diameter of the barrel neck 152. The plug portion 157 of the nozzle is designed to take up the ullage in the cartridge and thereby prevent the subsequent ejection of air. Intermediate the ends of the nozzle is a circular flange 158 which is adapted to overlie the open neck end of the barrel, see FIG. 18. When the cap 160, which has an opening through its bottom wall to receive the outer portion of the nozzle, is tightly threaded onto the neck, the flange 158 provides a sealing engagement between the two members. The forward end of the nozzle 49 includes a flattened guide portion 161 which is adapted to facilitate mounting of the cartridge as will hereinafter be further described.

It will be appreciated that the nozzle 49 includes a small diameter bore 162 therethrough which terminates in the conically shaped nipple 163. The conical shape of the nipple tends to reduce the tendency of the serum to form a droplet at the discharge end. Since a very small amount of serum is used in each test, the formation of such a droplet could significantly affect the amount of serum being discharged.

The sealed cap is used for storage and shipment of the cartridge, while the nozzle is used when injection of the serum is to be performed. Other external features of the cartridge are apparent. One is that it has graduations on its exterior which provide a continuous measure of the number of doses of serum remaining in the cartridge. Another external feature is that the nozzle is provided with a key precisely made to properly position the cartridge in the Coombs machine when the key is engaged in the machine's keyway. The operation and structure of these features are readily apparent from the description of the cartridge included herein. This is particularly true in regard to the proper positioning of the cartridge within the remainder of the apparatus.

It should also be kept in mind that all of the surfaces which contact the serum are constructed of material which has demonstrated compatibility with the serum. Furthermore, the nozzle incorporates a cylindrical section to take up space in the neck portion of the glass cylinder so that no serum is wasted when the piston is in the empty position. Additionally, the nozzle and plunger are shaped to permit priming of the cartridge prior to use and to minimize unusable serum. Also, it should be noted that the nozzle exit is angled slightly with respect to a perpendicular with the cartridge center line. Hence, when the cartridge is mounted in the machine with its center line horizontal, the nozzle injection stream is not vertical. This feature, together with the use of a proper internal pressure in the cartridge, is used to "shoot" the serum at a non-vertical angle. In this way, a number of injections may be injected into the same tube if it is so desired.

The sealing ring provided on the piston also provides a specific function in addition to its normal use of providing a seal. The additional function of note is to compensate for temperature (differential expansion) effects over the operating temperature range. This is important for if the friction were allowed to vary greatly, the internal pressure generated by the piston would vary and, in addition, a piston positioned-sensing switch in the machine could be adversely affected.

It should also be noted that the sealing ring is a Quad (quadrangular) ring rather than an O-ring to provide a better "zero pressure seal." Furthermore by providing the sealing ring on a reduced forward portion of the plunger, the seal area is free from parting lines and sealing is accomplished on smoother surfaces.

Also, by providing pressure on the sealing in one direction only, when the plunger motion is reversed the Quad ring tends to come off the plunger. This will reduce the tendency to rinse the cartridges which is undesirable since they are disposable and should not be reversed.

Additionally, utilizing the Quad ring rather than an O-ring, provides better low ambient pressure resistance. Since the Quad will not roll like an O-ring, it resists backward motion which can be caused by elevated temperatures and/or exposure to high altitude pressure. (In both instances the pressure inside the cartridges will exceed the external pressure.)

It is readily apparent from the description of the cartridge that it will serve a dual function. It is a container for shipment of serum, within which serum is stored and shipped, and then later becomes an automatic dispenser for the contents. The cartridge assembly is therefore a convenient vehicle which minimizes unnecessary handling or providing an accurate means for dispensing its contents.

To complete the description of the Coombs assembly 46, reference is made to FIGS. 15–16. The assembly is mounted on a fixed frame 166 which includes a front horizontal holder or platform. The forward end of the holder mounts both the nozzle 44 of the saline assembly 42 and the cartridge 48 as best seen in FIGS. 2 and 15. The nozzle 49 of the cartridge is positioned closely adjacent the nozzle 44, with both being directed downwardly through the opening 168 which is positioned above the individual vials 38 on the turntable 10. The forward end of the holder further includes an abutment member 169 which is designed to limit the forward movement of the cartridge 48 when it is operatively positioned thereon. The abutment member 169 includes a vertically directed slot 170 to receive the flattened portion 161 of the nozzle 49 and thereby prevent lateral and rotational movement of the cartridge. Also, a longitudinal channel 171 in the holder is designed to partially receive the cartridge and thereby to facilitate retention of the cartridge in its proper position.

A second opening 172 through the forward end of the channel is positioned radially inwardly from the opening 168. This second opening 172 is designed to mount a photocell 53 in a suitable retainer which is received in the channel 171. By design, the photocell 53 is positioned to monitor the light beam 54 emanating from the bulb 55.

To discharge the serum from the cartridge, the plunger 47 is mounted for axial movement against the rear wall of the piston. Thus movement of the plunger 47 drives the piston 154 into the barrel 150 to forcibly eject the serum through the nozzle 49 and into the underlying vial 38. The forward portion of the plunger is externally threaded, with the threads being engaged by the drive nut 175. The nut, which is rotatably driven by the gear 176, is keyed to the frame to prevent its axial movement. Thus, rotation of the nut 175 causes the plunger 47 to either advance or retract.

The gear 176 meshes with the gear 177 which is connected to the injection motor 51. By this arrangement, rotation of the motor causes the rotation of the gears 176 and 177 and nut 175, and thus the advance of the plunger 47. Rotation of the motor 51 in the opposite direction will cause the plunger to retract.

To accurately control the forward movement of the plunger, and thus the amount of serum ejected from the nozzle 49, a pair of cams 180 and 181 are mounted for rotation with the gear 176 and nut 175. In the particular embodiment of the assembly described herein, the gear and nut are designed to rotate one quarter turn per dosage of Coombs serum. Thus a stop signal to the motor 51 is required after the plunger has been advanced by a quarter turn of the nut. To provide this function, the forward cam 180 includes four equally spaced bumps which are designed to actuate the switch 183. The second coaxially mounted four bump cam 181 is positioned to actuate the override switch 184 for the purpose described in the following paragraph.

Describing the sequence of operations during the Coombs injection mode, the turntable is slowly rotated by the index motor 26. Whenever the photocell 53 senses a horizontal flag, a signal is sent by conventional circuitry from the photocell circuit to stop the index motor 26 and start the Coombs injection motor 51 which rotates the nut 175 to advance the plunger 47. Rotation of the nut 175 for a quarter turn discharges the desired amount of serum into the underlying vial 38, at which time the switch 183 stops the motor 51. Concurrently, the switch 184 overrides the photocell circuit to reactivate the index motor 26. This cycle is repeated whenever a vial is present on the turntable.

The rear portion of the Coombs assembly includes a fixed horizontal platform 186 having a slot 187 running immediately below the rear portion of the plunger. The plunger includes a downwardly extending fin 188 which is adapted to ride in the slot to thereby prevent the rotation of the plunger.

The opposite sides of the rear portion of the plunger include cam surfaces 190 and 191 which terminate in abutments 192 and 193 respectively, note FIG. 15. A switch 194 is associated with the surface 190 and is actuated when its arm engages the abutment 192. Similarly, the switch 195 is actuated when its arm engages abutment 193. It will thus be apparent that as the plunger advances into the cartridge, switch 194 will first be actuated and switch 195 will subsequently be actuated. By design, these switches indicate when the cartridge is low on serum (e.g., less than 25 doses remaining) and when the cartridge is empty, respectively. The switch 194 controls the low signal lamp 68 on the control panel and the switch 195 controls the empty signal lamp 69.

After the cartridge has been initially placed on the assembly 46, it is desirable that the plunger be rapidly advanced until it engages the rear wall of the cartridge piston 154. Also, it is desirable that an automatic stop for the plunger advance be provided when contact with the piston is made. For this purpose, a rapid advance switch (not shown) is placed on the cabinet of the apparatus to independently actuate the injection motor 51 and thereby advance the plunger, the advance in this case being independent of the stop switch 183. In addition, a push rod 198 is positioned in a central bore extending through the length of the plunger 47. As indicated in FIG. 16, the rod 198 is normally biased to protrude a short distance ahead of the forward end of the plunger. A switch 199, which is mounted to ride on the rear end of the plunger, is actuated whenever the rod 198 is depressed into the plunger. Thus during operation of the rapid advance, the plunger advances until the rod contacts the rear wall of the piston 154. By design, the switch 199 is actuated just as the forward tip of the plunger 47 comes into engagement with the wall of the piston. The switch 199 overrides the rapid advance switch and terminates rotation of the motor 51.

For rapid retraction of the plunger, a retraction switch (not shown) is also placed on the cabinet to independently actuate the injection motor 51 in the reverse direction. A switch 200, which is mounted to the fixed platform 186, is adapted to be actuated by the plunger when it reaches its point of maximum retraction. Switch 200 similarly overrides the retraction switch to stop the injection motor 51.

Also associated with the Coombs injection system is a priming switch (not shown) which is mounted on the external cabinet of the apparatus. The priming switch, when actuated, cycles the injection system once and thus is effective to discharge one dose of serum from the nozzle. By cycling the system one or two times after the plunger 47 has contacted the piston 154, the technician will have complete assurance that no air is in the system and that subsequent ejections will contain the proper amount of serum.

Operation of the apparatus

To initially prepare the apparatus of the present invention to run a Coombs test, the saline supply container is first connected to the tube 125 leading to the saline fill apparatus. The saline fill system should then be primed by actuation of the priming switch a number of times until all of the air is expelled.

Next, the drainage port in the windage bowl 40 is connected via the external connection 204 to a catch bottle (not shown). Since drainage from the bowl depends on gravity, the catch bottle should be positioned below the windage bowl.

The cartridge 48 is next positioned on the holder 50 in the manner shown in FIGS. 15–16. To rapidly advance the plunger into contact with the cartridge piston, the rapid advance switch is closed to energize the motor 51 and rotate the nut 175. When the contact with the piston 154 is made, the push rod 198 actuates switch 199 to terminate the advance operation before any serum is dispensed. It will be seen that this arrangement facilitates the use of partially filled or previously used cartridges. Thus whether the cartridge 48 is completely full or not, the plunger may be quickly brought into engagement with the piston 154. To prime the system, the priming switch is actuated a number of times until no air is discharged from the nozzle.

While the head 10 may be removed from the shaft 12 by removing the knurled head retaining screw 19, it will be assumed that the head is properly positioned on the shaft and that the screw 19 is securely hand tightened.

The apparatus is now ready for operation. To perform each test, a measured amount of red blood cells are first manually placed in a vial 38. This vial, together with up to five other vials, may be placed in a single carrier. Since the apparatus described herein is adapted to receive four carriers, it will be apparent that up to 24 tests may be conducted simultaneously on each run of the machine. In the interest of maintaining balance of the device during centrifugation, it is recommended that only an even number of vials be placed on the head, with the vials being evenly spaced about the periphery.

With the on-off switch 63 in the "on" position, the programer 73 (FIG. 3) is turned to a point at the start of the first wash cycle. The start button 65 is then actuated to start the automatic cycle. While the programer 73 has not been described in detail herein, it will be appreciated that it is of a conventional and well known design, and that it is operative to sequentially intiate and terminate the various operations of the apparatus. A programer of this type may be purchased from the Cramer Division of the Conrac Corporation, Elmsford, N.Y.

The programer 73 initially actuates the saline fill cycle. During this cycle, the head 10 is slowly rotated in a counterclockwise direction by the index motor 26. After actuation of the arming switch 113 by the cam 117, each vial will automatically receive approximately three ml. of saline as it passes under the discharge nozzle 44. More particularly, the vial 38 will have rotated the associated flag to its horizontal position. As the flag breaks the light beam 54, the photoelectric circuit acts to stop the motor 26 and actuate the solenoid 136 to discharge the proper amount of saline into the vial. By reason of this unique sensing mechanism, only those carrier positions with vials present will receive saline. When the solenoid reaches the top of its stroke, the switch 138 is actuated which releases the solenoid and overrides the stop signal from the photocell circuit to again start the index motor 26. It will be noted from FIG. 2 that the saline is forcibly ejected from the nozzle 44 against the side of the vial. In view of this fact, the entering saline will swirl and completely mix with the blood cells in the vial.

When the fill cycle has been completed, the programer 73 initiates the spin cycle. In the present embodiment, the head 10 is rotated for approximately 93 seconds; 18 seconds to reach speed, 60 seconds at 3200 r.p.m. (approximately 1300 RCF) and 15 seconds for braking to stop.

During centrifugation, the trunnions 30 are rotated to the extending position C shown in FIG. 2 to assure retention of the carriers and vials, as well as the contents of the vials. As previously noted, braking is accomplished by reversing the polarity of the motor 20.

When rotation of the head 10 stops, the electromagnetic coils 105 beneath the base 14 are actuated to pull the magnetic inserts 32 on the trunnions toward the shaft 12 to position A. The usual angle of centrifugation of the vials is thus reversed. The centrifuge now operates for three seconds at approximately 290 r.p.m. and due to the reverse negative angle of the vials, the saline is thrown upwards and out of the tube vials. However, the red blood cells remain. It will be appreciated that the particular negative angle of decant employed, as well as the speed and time of rotation, must be closely interrelated to assure retention of a "button" of red blood cells in the vials.

The above described wash cycle, comprising the saline injection, spin and decanting, occurs automatically three times. At the termination of the third wash cycle, the programer 73 initiates the Coombs injection cycle. As in the wash cycle, the turntable 10 is slowly rotated by the index motor 26. Whenever the photocell 53 senses a horizontal flag, a signal is sent to stop the index motor 26 and start the Coombs injection motor 51. The motor 51 rotates the nut 175 for a quarter turn to discharge the desired amount of serum into the underlying vial. At this point, the switch 183 stops the motor 51 and the switch 184 overrides the photocell circuit to reactivate the index motor 26. This cycle is repeated whenever a vial is present on the turntable as the turntable rotates through one complete revolution during which the system has been armed by the switch 113 at the index wheel 24.

Both immediately before and when the Coombs fill cycle has been completed, the electromagnetic coil 105 is pulsated such that the trunnions 30 and vials 38 are alternately drawn to the pole ring 33 and then flipped back by the springs 90 and 91. This operation insures complete mixing of the cells with the Coombs serum as well as proper agitation before addition of the Coombs serum.

Next, the head 10 is centrifuged for an additional 90 seconds; 18 seconds to reach speed, 60 seconds at 1900 r.p.m. (500 RCF) and 15 seconds braking to a stop. The entire test cycle is then completed, and the final fluid in the vial is ready for subjective analysis by the technician.

It will be recalled that the control panel 62 on the front of the apparatus includes a pushbutton 67 designated 500 RCF spin. Actuation of this button initiates a 500 RCF spin cycle which is independent of the programer 73. This feature permits the apparatus to be used for other blood bank centrifugation purposes, the cycle of which is the same as the 500 RCF spin cycle in the automatic Coombs procedure. In the particular, the centrifuge will operate for 83 seconds; 18 seconds to reach speed, 60 seconds at 1900 r.p.m. (500 RCF), followed by 5 seconds braking to stop.

It will also be apparent that in order to accurately perform the Coombs test, suitable controls must be provided to accurately govern the rotational speed of the main motor 20. In this regard, it will be recalled that the motor initially rotates the head at a speed of approximately 3200 r.p.m. during the wash-spin cycle, at 1900 r.p.m. during the Coombs spin cycle (as well as the independent 500 RCF cycle), and at 290 r.p.m. during the decant spin. The centrifugal speed governor 110, which is positioned immediately below the motor 20, is utilized in the particular embodiment shown to control the 290 r.p.m. speed. To control the speed at 1900 r.p.m., a conventional transistorized speed control (not illustrated) is provided which operates by controlling the power to the motor. The 3200 r.p.m. speed is the maximum speed of the motor and thus no control is required.

We claim:

1. In an apparatus for sequentially dispensing a measured quantity of a liquid into each of a series of containers, said apparatus comprising:
a circular turntable having a plurality of receptacles positioned about the periphery thereof, each of said receptacles being adapted to receive a single container in substantially vertical relationship, pivotally mounted flag means associated with each of said receptacles, said flag means comprising first and second radially disposed arms, said first arm extending into said receptacle and being adapted to be rotated by the entry of said container into said receptacle, said second arm extending outside said receptacle in a generally downward direction, whereby the rotation of said first arm caused by the entry of said container into said receptacle effects rotation of said second arm into a substantially horizontal position,
means to rotate said turntable,
and a dispensing mechanism overlying said turntable, said dispensing mechanism including a nozzle positioned immediately above the periphery of said turntable and being adapted to dispense a measured quantity of said liquid through said nozzle and into an underlying container positioned in a receptacle on said turntable, means associated with said dispensing mechanism for detecting said flag second arm when said second arm is in its horizontal position and the associated container is immediately below said nozzle, and means to actuate said dispensing mechanism whenever said detecting means detects said second arm.

2. The apparatus as defined in claim 1 wherein said means for detecting said flag second arm comprises a vertically disposed light beam immediately adjacent said nozzle, and photoelectric means to monitor said beam, said beam being interrupted by a horizontal flag second arm.

3. The apparatus as defined in claim 2 wherein said dispensing mechanism includes a solenoid actuated pump to deliver a predetermined quantity of said liquid from a storage container upon each forward stroke of said solenoid.

4. The apparatus as defined in claim 2 wherein said dispensing mechanism includes a removable cartridge containing said liquid, said cartridge comprising a tubular barrel closed at one end by a nozzle and at the opposite end by a cylindrical piston positioned within the bore of said tubular barrel,
a holding frame for mounting said cartridge with said nozzle directed downwardly,
and means for driving said piston along the bore of said cartridge barrel to dispense said liquid through said nozzle.

5. The apparatus as defined in claim 4 wherein said means for driving said piston includes an axially movable plunger having a forward end adapted to engage the outer wall of said piston, said plunger being externally threaded,
and means for axially advancing said plunger comprising a rotatable nut threadedly engaging said plunger.

6. The apparatus as defined in claim 5 further including means for rotating said nut, means for monitoring the rotation of said nut, and switch means actuated by said monitoring means to disengage said rotating means when said nut has rotated a predetermined amount.

7. In an apparatus for sequentially dispensing a measured quantity of a liquid into each of a series of containers and for centrifuging and decanting the contents thereof, said apparatus comprising,
a circular turntable rotatable about a vertical axis, a plurality of carriers mounted about the periphery of said turntable for receiving said containers, each of said carriers being pivotally mounted for rotation about a chordal axis, and means for rotating said turntable at a relatively slow indexing speed,
flag means associated with said carriers to indicate the presence of individual containers in said carriers,
a liquid dispensing mechanism overlying the periphery of said turntable, said dispensing mechanism being operable during indexing of said turntable and including a nozzle overlying said carriers, means associated with said dispensing mechanism for detecting said flag means when said flag means indicates the presence of an individual container, and means to actuate said dispensing mechanism when said detecting means detects a container, whereby said liquid is dispensed only when a container passes beneath said dispensing mechanism,
means for rotating said turntable at a speed sufficient to cause said carriers to rotate about said chordal axis and to centrifuge the contents of said containers,
magnetic means associated with said turntable to tilt each of said carriers at a negative angle, and means to rotate said turntable at a controlled speed during engagement of said magnetic means whereby at least a portion of the contents of said containers will be decanted.

8. An apparatus as defined in claim 7 further including spring means to urge said carriers from said negative angle position to a vertical position, and means to alternately engage and disengage said magnetic means, whereby alternate engagement and disengagement of said magnetic means causes the contents of said containers to be agitated.

9. The apparatus as defined in claim 8 wherein said magnetic means comprises a pole ring positioned about the axis of said turntable and a magnetic insert attached to each of said carriers, said magnetic inserts being spaced from said pole ring when said carriers are in their vertical position and contacting said ring when said carriers are in their negative angle position, and electromagnetic means positioned adjacent said pole ring whereby energization of said electromagnetic means causes magnetic lines of flux to pass through said ring and said insert to thereby draw said insert into contact with said ring.

References Cited

UNITED STATES PATENTS

| | | | |
|---|---|---|---|
| 1,959,122 | 5/1934 | Chapman | 141—124 |
| 3,139,915 | 7/1964 | Minard | 141—141 |

HOUSTON S. BELL, Jr., Primary Examiner

U.S. Cl. X.R.

141—124, 141; 222—309, 327